United States Patent [19]

Musschoot

[11] Patent Number: 4,775,284
[45] Date of Patent: Oct. 4, 1988

[54] VERTICAL MASS FLOW CONVEYOR

[75] Inventor: Albert Musschoot, Barrington, Ill.

[73] Assignee: General Kinematics Corporation, Barrington, Ill.

[21] Appl. No.: 936,794

[22] Filed: Dec. 2, 1986

[51] Int. Cl.[4] .................................................. B65G 15/00
[52] U.S. Cl. ............................... 198/550.01; 198/756; 198/771
[58] Field of Search ............... 198/757, 771, 756, 521, 198/518, 550.01; 414/326, 317, 319, 320, 304

[56] References Cited

U.S. PATENT DOCUMENTS

| | | | |
|---|---|---|---|
| 2,609,914 | 9/1952 | Balsiger et al. | 198/391 |
| 2,658,286 | 11/1953 | Spurlin | 34/147 |
| 2,688,807 | 9/1954 | Ginther | 198/756 X |
| 2,771,983 | 11/1956 | Carrier | 198/756 |
| 3,053,380 | 9/1962 | Spurlin | 198/220 |
| 3,171,538 | 3/1965 | Hagenbook | 198/213 |
| 3,178,013 | 4/1965 | Hubbard | 198/220 |
| 3,429,423 | 2/1969 | Pirrello et al. | 198/757 |
| 3,530,974 | 9/1970 | Moore | 198/757 |
| 3,789,977 | 2/1974 | Musschoot | 198/220 |
| 3,838,770 | 10/1974 | Caffa | 198/757 |
| 3,848,343 | 11/1974 | Musschoot | 34/164 |
| 3,850,288 | 11/1974 | Musschoot | 198/220 |
| 4,245,737 | 1/1981 | Pellerin et al. | 198/756 |
| 4,267,919 | 5/1981 | Schrader | 198/756 |
| 4,384,535 | 5/1983 | McKelvie | 198/757 X |

FOREIGN PATENT DOCUMENTS 681704 10/1952 United Kingdom ............... 198/757

Primary Examiner—Robert J. Spar
Assistant Examiner—Jennifer L. Doyle
Attorney, Agent, or Firm—Wood, Dalton, Phillips, Mason & Rowe

[57] ABSTRACT

A vertical mass flow conveyor includes a vertical tube which has an inner surface fixed to the outer surface of a spiral ramp. The spiral ramp extends radially inward of the tube only a portion of the radius of the tube to leave the center section of the tube free and forming a vertical open space. The tube has an inlet to the spiral ramp and an outlet. A hopper or trough substantially surrounds the inlet of the tube for receiving material to be conveyed up the inside of the tube. One or more guide vanes or blades, face generally in the direction of the upward spiral of the spiral ramp, and disposed about the tube for directing the material radially inwardly toward the spiral ramp. The tube with a vibratory motion transmitting device, the trough and the vanes or blades are secured to a common base such that when a helical reciprocating movement is produced in the tube, bulk material either is vertically conveyed in a mass flow relationship or is blended and mixed in the tube.

26 Claims, 2 Drawing Sheets

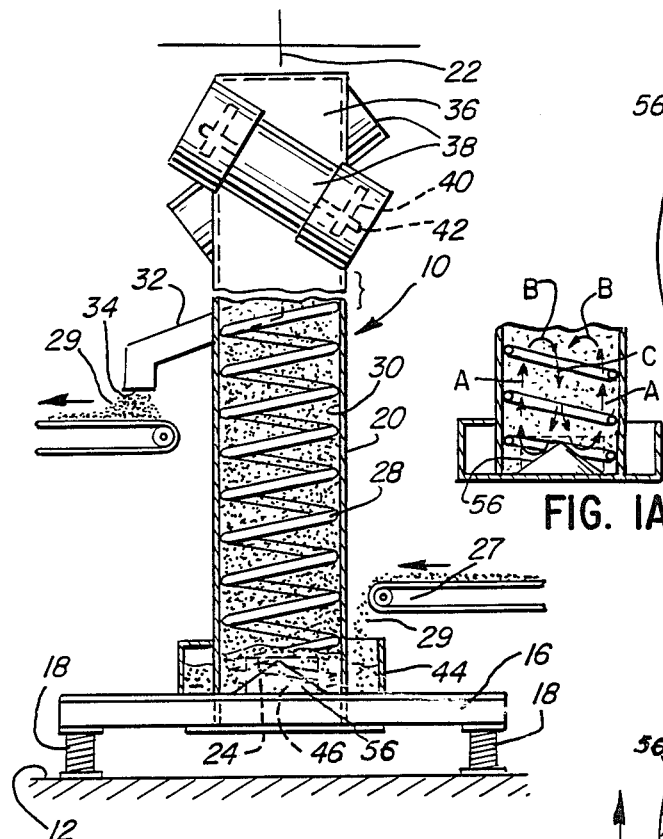
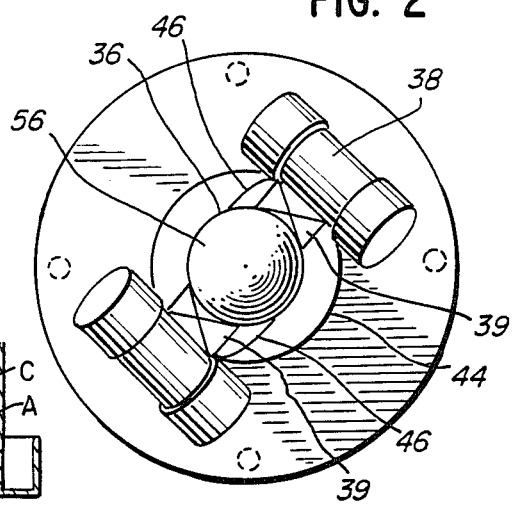
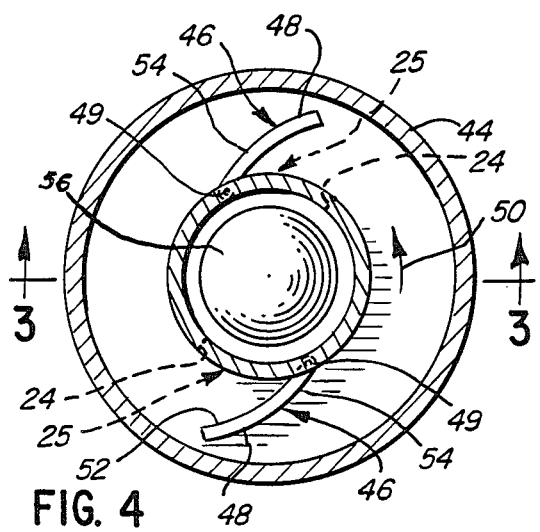
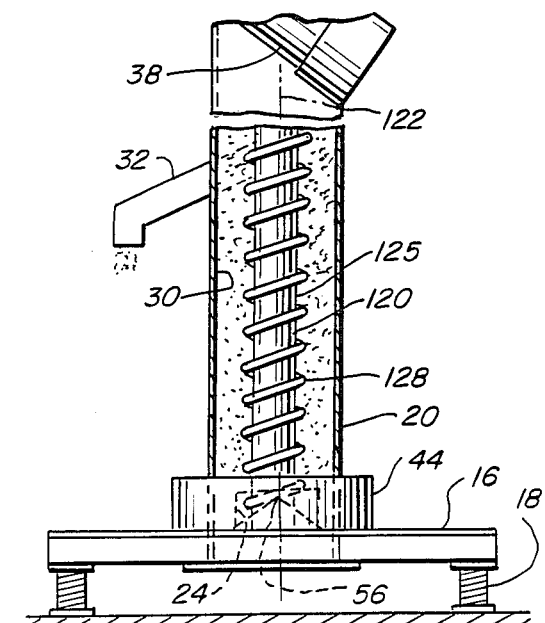
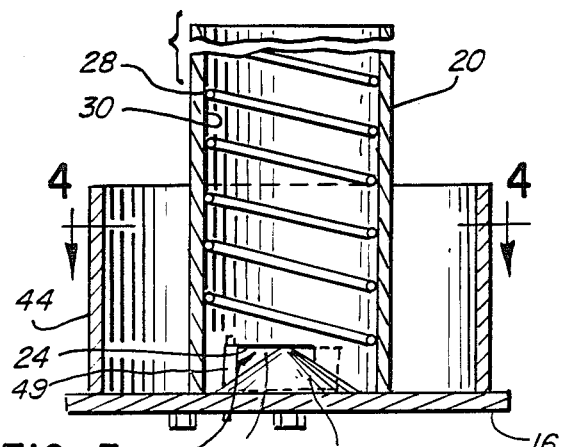

VERTICAL MASS FLOW CONVEYOR

FIELD OF THE INVENTION

This invention generally relates to vibratory conveyors and, more particularly, to a vertical mass flow elevator for materials or articles, particularly bulk materials, utilizing a spiral ramp.

BACKGROUND OF THE INVENTION

Vibratory conveyors have been used for some time and take various forms or configurations depending upon the materials or articles to be conveyed and the system within which the conveyance is to be employed. There are many types of straight-line vibrating conveyors which often are inclined to convey materials or articles generally in a horizontal direction but slightly up an inclined ramp. Circular conveyors also are known for lifting materials or articles and frequently use a spiral configured conveying ramp. With circular conveyors, vibrating motion causes the articles to move continuously in a circle while moving upwardly along the spiral ramp. Therefore, the motion transmitted or imparted to the conveyor must be both vertical and twisting in a horizontal plane. This is sometimes called a helical reciprocating motion. Such vibratory conveyors are used because of their versatility in operating with less energy costs and can handle quite a variety of materials or articles, ranging from machinery parts to very fragile articles. One such device is shown in my earlier issued U.S. Pat. No. 3,789,977 where the spiral ramp has an outer vertical shoulder for retaining the articles or materials on the ramp for elevating same.

Other such vertical lift devices were disclosed in U.S. Pat. Nos. 2,658,286 and 3,053,380 to W. V. Spurlin, in U.S. Pat. No. 3,178,013 to Hubbard and U.S. Pat. No. 4,248,737 to Pellerin et al all of which show spiral ramps in tubes around tubes and/or with vertical shoulders for confining the articles or material to the ramp for vertical conveying.

Another form of vertical conveyor using a spiral ramp is shown in U.S. Pat. No. 3,171,538 to L. D. Hagenbook wherein the spiral ramp is in a tube or cylinder with an open center. The Hagenbook ramp and tube are rotatably driven about the vertical axis so as to screw the material up the ramp and outwardly against the inside of the tube by centrifugal forces.

One of the areas of continuous problems is in applications for conveying bulk materials with vertical, spiral lift-type conveyors. With the conveyance of individual articles, the spiral ramp often is simply cupped in a cross-direction and the articles can be vibratorily lifted along the spiral ramp without even having any confining means about the periphery of the ramp. However, in dealing with bulk materials, there often are limitations as to the height which the materials can be conveyed within reasonable parameters, such as the size of the ramp, the vibrating or orbiting motor drive, the method of feeding the lower end of the conveyor, and other components. Often, the vibratory drive means may be mounted intermediate the ends of the vertical conveyor, or plural drive means may be employed both at the bottom and the top of the conveyor in order to impart adequate helical reciprocating movement to the bulk materials. There appears to be an interrelationship between the vertical ramp construction, the method of feeding the bulk materials and confinement of the materials during vertical lift.

This invention is directed to solving the problems existent with current vertical conveyors and satisfying the need for a new and improved vertical mass flow conveyor particularly for bulk materials.

SUMMARY OF THE INVENTION

An object, therefore, of the invention is to provide a new and improved vertical lift conveyor of the type utilizing a helical reciprocating spiral ramp.

In one exemplary embodiment of the invention, the vertical mass flow conveyor includes a vertical tube or cylinder which was an inner surface operatively associated with an outer surface of a spiral ramp. The spiral ramp extends radially inward from the inner surface of the tube only a portion of the radius of the tube to provide a substantial vertical open space in the tube. The tube has inlet means at the lower portion defining access to the spiral ramp. Appropriate outlet means are provided at the upper portion of the tube. Trough or hopper means are carried by the lower portion of the tube and substantially surround the inlet means of the tube for receiving bulk material to be conveyed in a mass flow up the inside of the tube along the spiral ramp. Guide means in the form of one or more blades or vanes are provided in the trough or hopper about the tube for directing the bulk material radially inwardly into the tube and in contact with the spiral ramp. Motion transmitting means transmits a helical reciprocating movement to the tube and spiral ramp whereby bulk material extends across the full width of the tube and is conveyed up the full height of the tube in a mass flow. When the trough or hopper is empty or runs dry, no material is discharged from the outlet and the material in the tube is recirculated in the tube to blend, to mix, to heat or cool and/or to tumble the bulk material in the tube.

More specifically, a base, such as a generally horizontal frame structure, is mounted by resilient isolation means to a subjacent support structure. The motion transmitting means is secured to the top portion of the tube. The trough or hopper means with the spiral ramp, vertical tube, and motion transmitting means are secured to the base for conjoint helical reciprocating movement by the motion transmitting means.

The guide means when curved has one or more blades or vanes with the concave side thereof facing generally in the direction of the upward spiral of the spiral ramp. The vanes preferably are angularly spaced within the trough means equidistant about the vertical tube.

Modified forms of the preferred vertical conveyor include (1) a spiral ramp that has a flat vertical facing surface, (2) has a second tube in the first tube with the spiral ramp on said second tube or (3) has a second tube in the first tube with a spiral ramp in the first tube and a spiral ramp on the second tube all of which modified forms convey bulk material in a mass flow relationship vertically and/or mix the bulk material in the tube.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a broken elevational view of the vertical mass flow conveyor showing one preferred form of the invention conveying bulk material vertically;

FIG. 1(a) is a broken away partial view of the apparatus of FIG. 1 operating as a blender or mixer;

FIG. 2 is a somewhat schematic view looking down onto the conveyor of FIG. 1;

FIG. 3 is a fragmented vertical section taken generally along line 3—3 of FIG. 4;

FIG. 4 is a horizontal section taken generally along line 4—4 of FIG. 3;

FIG. 5 is a broken partial elevational view of a modified form of vertical lift conveyor;

DETAILED DESCRIPTION OF THE PREFERRED EMBODIMENT

Figure 6:
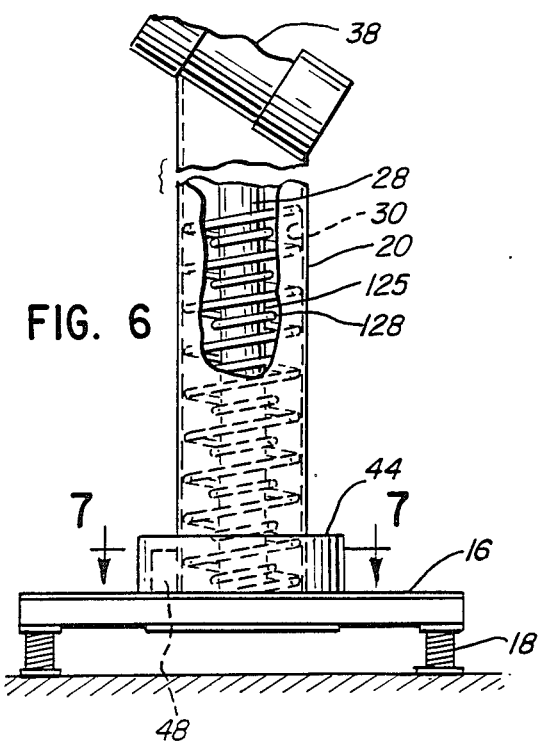
FIG. 6 is a broken partial elevational view of a second modified form of the vertical lift conveyor.

Referring to the drawings in greater detail, and first to FIG. 1, a vertical lift or mass flow conveyor, generally designated 10, is illustrated mounted on a subjacent support structure, such as a floor 12. A base, such as a horizontal frame structure 16, is mounted to the floor 12 by resilient isolation mounting means, in the form of isolation springs 18.

The vertical lifting conveyor components include a vertical cylindrically shaped housing or tube 20 having a vertical axis 22. The housing or tube 20 is affixed to the frame structure 16 and has openings 24, best illustrated in FIGS. 3 and 10, through which the material to be conveyed flows as will be described hereinafter. Located within tube 20 is a helical or spiral ramp 28. Tube 20 has an inner cylindrical surface 30 to which the radially directed outer surface of the spiral ramp 28 is affixed in operative association therewith. In this context and in the claims herein, the term "fixed" or "in operative association" may include staking, gluing, tacking, pinning or the equivalent attachment between the inner surface of the tube 20 and the radially directed outer surface of the spiral ramp 28.

The spiral ramp 28 of the illustrated embodiment is a helically wound piece of tubular material having a substantially circular shape in cross-section. The tubular material could be plastic (such as polycarbonate or the like) or metal (spring steel or the like) and is fixed to the inside surface of the tube with the appropriate lead angle. The spiral ramp 28 extends radially inward from the inner surface of the tube only a portion of the radius of the tube to leave the center section of the tube free and forming a vertical open space extending from the inlet end to the outlet end of the tube when the conveyor is empty. In one operative embodiment of the vertical mass flow conveyor, the diameter of the tubular material of the spiral ramp was approximately 15 to 25% of the radius of the tube.

Openings 24 are formed through the walls of the lower portion of the tube 20 and act in conjunction with the top surface of the frame 16 to define two inlets 25 into the tube 20. An outlet chute 32 projects through tube 20 near its upper end for receiving the bulk material from the top of the spiral ramp 28 and for delivering the bulk material, as at 34, to its appropriate destination or to other appropriate conveying means. The top of housing or tube 20 may be secured to an overhead support or to appropriate stabilizer members as needed.

The upper portion of the housing or tube 20 has an extension 36 to which a pair of motors 38 are mounted on platforms 39 on diametrically opposite sides thereof. Each motor 38 has a pair of eccentrics 40 mounted on each end of the output shaft 42 (see FIGS. 1 and 2) to impart a helical reciprocating movement to the housing or tube 20 and to the spiral ramp 28. The motors 38 and eccentrics are conventional vibration generating apparatus and may have variable force generating capability such as shown in my U.S. Pat. Nos. 3,358,815; 4,168,774 and 4,495,826. The term helical reciprocating movement is understood to mean a movement whose alternately upward and downward translation components are relatively small and whose rotations, alternate in opposite horizontal directions, also are relatively small in amplitude whereby such movement is reduced to a vibration, usually scarcely visible to the eye. This movement is effected by disposing motors 38 at an angle to the horizontal as well as at angle to the vertical axis 22, as seen in FIG. 1. The motors also are at opposite angles relative to each other as shown in FIG. 2. It should be noted that the housing or tube 20 is on the same axis 22 as spiral ramp 28 and is "fixed" to the radial outer surface of said spiral ramp 28 whereby the spiral ramp 28 and the tube 20 helically reciprocate conjointly by motor 38 operating thorugh a common base provided by horizontal frame structure 16.

Referring to FIGS. 2–4 in conjunction with FIG. 1, a cylindrical trough or hopper 44 is disposed concentric with, is spaced radially outwardly from and is in surrounding relationship to the lower portion of the vertical tube 20 about the openings 24 and inlets 25 thereto. The top of the trough or hopper 44 is spaced above the top of the inlets 25. A feed chute or conveyor 27 feeds bulk material 29 to the hopper. Guide or impeller means 46 in the form of two or more curved blades or vanes 48 are disposed within trough or hopper 44 for receiving and guiding bulk material to be conveyed up spiral ramp 28 within tube 20. The curved vanes or blades 48 are pivotally mounted at pivot 49 in the mouth of the openings or inlets 25 and extend outwardly into the oncoming path of movement of the bulk material as designed by the arrow 50 in FIG. 4. The concave surface 52 of the arc of the vanes 48 is such that the portion of the vane near the pivot approaches a tangent to the inside surface 30 of the tube 20. It can be seen that the curved vanes or blades 48 are curved generally in the direction of the upward spiral of spiral ramp 28. The angle the vanes 48 make with respect to the tube is determined in part by the granular size and density of the bulk material, the rate of feed of the bulk material up the vertical lift, the surface characteristics of the bulk material and other variables. Once the angle of the vanes is determined, the vanes are locked in place with respect to the tube. The trough or hopper 44 is fixed to the top side of the horizontal frame structure 16, with the vanes 48 mounted by means of pivots 49 (FIG. 3 and FIG. 10) to the vertical tube 20 and to the frame 16. Therefore, the entire assembly of spiral ramp 28, vertical tube 20, trough or hopper 44 and vanes 48 are imparted with helical reciprocating movement by motors 38 because all of the components of the assembly are integral with a common base formed by horizontal frame structure 16. The vanes or blades 48 may be straight or covered without departing from the invention.

As can be seen in particular in FIG. 3, a flat cone shaped feeder 56 is mounted on the frame structure 16 inside the tube 20. The vertical axis of the cone of the feeder 56 coincides with the vertical axis 22 of the tube 20. As the vanes 48 of the guide means 46 capture and feed bulk material into the inlets 25 of the tube, the feeder 56 deflects the material against the inside surface 30 of the tube 20 whereupon the spiral ramp 28 moves the bulk material in a mass flow relationship upward inside the tube 20. The surprising and unexpected result of the above spiral ramp 28 extending only a short distance (i.e. 15-25%) into the open space in the tube 20 was that with the vibratory members 48 running and bulk material being fed into the hopper and guided into the inlet of the tube by the two vanes 48 was to elevate the bulk material up the inside of the tube in a mass flow relationship. As long as bulk material was in the hopper, the mass or column of material was moved upward and out the discharge. When the hopper ran dry (no new material added and substantially no material left in the hopper), the conveyor acted as a mixer or blender as shown somewhat schematically in FIG. 1(a. That is, the column of material no longer advanced up the tube but instead the spiral ramp moved material up the inside surface of the tube (arrow A FIG. 1(a) and at the top of the column the material rolled into the center of the tube (arrow B FIG. 1(a) moved back down to the lower end of the tube (arrow C FIG. 1(a) where the material spread out and was again picked up by the spiral ramp and transported back to the top of the column all the time blending and mixing within the body of the column.

When fresh bulk material was fed to the hopper, the tube and spiral ramp (acted somewhat like a treaded nut and) moved the bulk material up the tube in a mass flow as a substantially solid body (acting somewhat like a threaded screw being advanced by the threaded nut). The movement of the bulk material as a mass or substantially solid column occurred even though only about 20% of the mass was being supported by the spiral ramp. Depending upon the bulk material being vertically conveyed, the ratio of the diameter of the spiral ramp to the radius of the tube can vary from about 5% to about 75% and possibly greater.

Although in this embodiment only two vanes are shown and were used in practice more vanes can be used without departing from the invention. In fact, in one test the vanes were not evenly spaced apart and the conveying of the mass of bulk material was not impaired. It has been found in practice that the capacity of material vertically conveyed can be roughly doubled by using four guide means in stead of two. It has also been found that increased capacity is obtained by extending the guide means to about the midportion of the space between the tube 20 and the hopper 44.

Referring to FIG. 4 in conjunction with FIG. 3, each pivot 49 is positioned to locate the pivoted end 54 of the vanes or blades in the mouth of the inlet 25. Each pivot 49 is adjustable by loosening a mounting member extending through horizontal frame structure 16. The pivots 49 stabilize and position the vanes or blades 48. As seen in FIG. 4, each vane has its inner portion 54 fixed to the respective pivot 49. Therefore, the angle of the vanes 48 can be adjusted by loosening and retightening the mounting member on the pivots 49.

From the foregoing, it can be seen that the entire feeding and conveying assembly is conjointly, helically, reciprocally vibrated by motors 38, through the common base provided by horizontal frame structure 16. The vanes or blades 48 generally uniformly feed bulk material angularly about the horizontal tube to the spiral ramp. The tube, being fixed to the radially directed outer surface of the spiral ramp, cooperates therewith to lift the bulk material in mass flow relationship. With all of the components vibrating conjointly in a unitary fashion, a very uniform and surprisingly effective mass flow lifting movement is imparted to the bulk material.

The embodiment shown in FIG. 5 provides for the base 16, the resilient isolation springs 18, the tube 20 having the inlets 25 and outlet 32, hopper 44, guide vanes or blades 48 and vibratory motion transmitting means 38 the same as in the embodiment of FIGS. 1-4. A second vertical tube 120 is concentrically affixed to the base 16 with its vertical axis 122 coincident with the vertical axis 22 of the tube 20. A spiral ramp 128 has a radially directed inner surface fixed to the outside surface 125 of the second tube 120. The spiral ramp 128 extends radially outward toward the inside surface 30 of the tube 20 covering only a portion of the radius of the tube 20 to leave a center section between the tube 20 and second tube 120 free and forming a vertical open space extending from the inlet end to the outlet end when the conveyor is empty. With the motors 38 operating, bulk material fed to the hopper 44 is vertically conveyed in mass flow as a column up the vertical open space between the inside surface of the tube 20 and the outside surface of the second tube 120. When bulk material is no longer fed to the hopper and after the hopper has emptied, the bulk material in the column will be mixed or blended the same as described with respect to the version of the invention shown in FIGS. 1-4.

Figure 7:
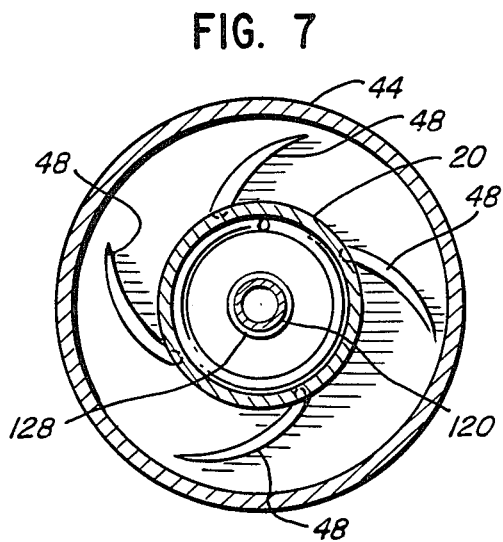
FIG. 7 is a horizontal section taken generally along line 7—7 of FIG. 6.

The modification of FIGS. 6 and 7 combine the features of the modifications of FIGS. 1-4 and FIG. 5. That is, the tube 20 has on its inside surface the spiral ramp 28 and the second tube 120 has on its outside surface the spiral ramp 128. The ramps 28 and 128 radially extend toward each other but leave a substantially open space therebetween. The modification of FIGS. 6 and 7 conveys and mixes bulk material substantially as described in FIGS. 1-4 and FIG. 5. Different types and kinds of bulk material can be more effectively conveyed and mixed with the FIGS. 6 and 7 modifications. FIG. 7 shows four guide blades or vanes 48 being used—this number also is optional depending once again on the most efficient structure to best move the types and kinds of bulk material being worked on.

Figure 8:
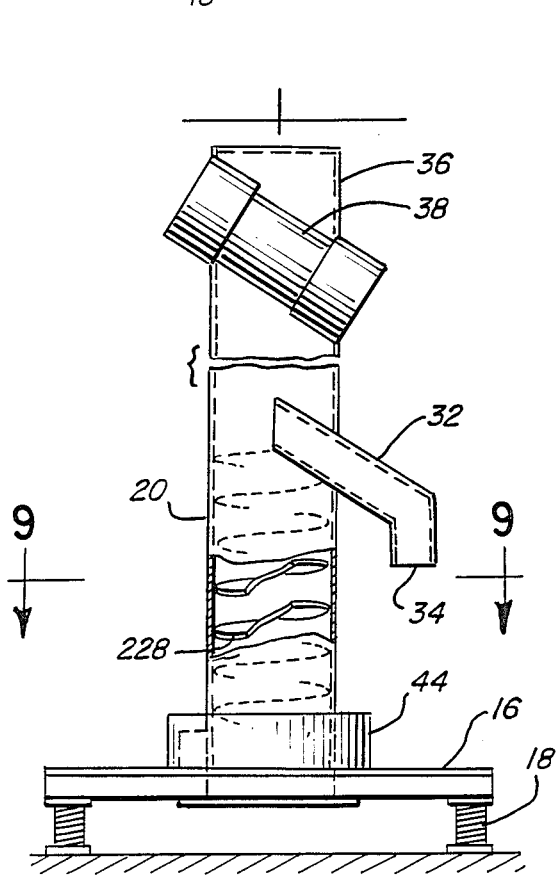
FIG. 8 is a broken partial elevational view of a third modified form of the vertical lift conveyor.
Figure 9:
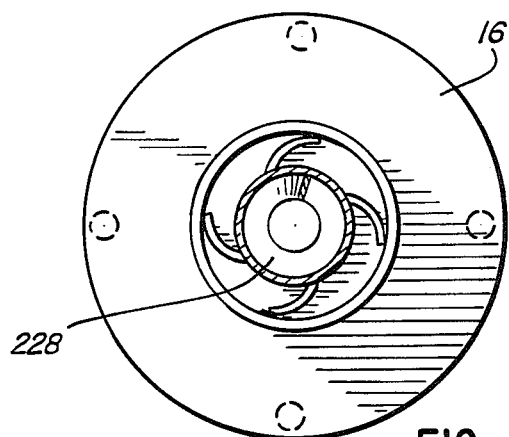
FIG. 9 is a horizontal section taken generally along line 9—9 of FIG. 8.

The modification of FIGS. 8 and 9 shows a flat ribbon-like spiral ramp 228 affixed on the inside surface 30 of tube 20. The spiral ramp 228 extends radially inward from the inner surface 30 only a portion of the radius of the tube 20 to leave the center section of the tube free and forming a vertical open space extending from the inlet to the outlet end of the tube when no bulk material is in the conveyor. The conveyor of FIGS. 8 and 9 conveys and mixes bulk material substantially as described with respect to the embodiment shown in FIGS.

1-4. Four guide vanes or blades 48 are shown although as mentioned before, the numbers of vanes being only a matter of efficiency considering the bulk material being conveyed.

Figure 10:
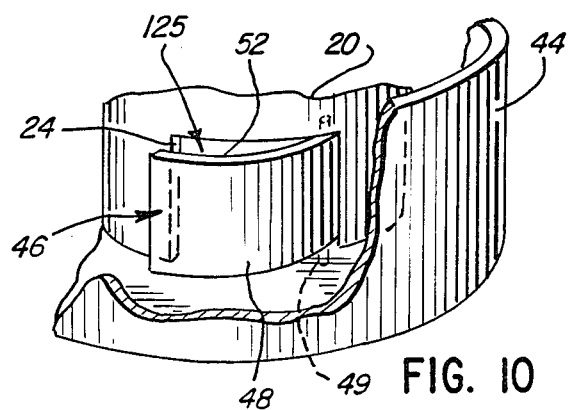
FIG. 10 is a partial perspective view of one of the vanes or blades for the guide in the trough or hopper of the invention.

FIG. 10 is a perspective view of one guide vane or blade 48 in operative position in an inlet 125 in tube 20. The vane 48 is pivotally mounted by pivot pin 49 and has its outer end portion projecting into the oncoming flow of bulk material. The curve of the guide vane 48 changes the direction of flow of the bulk material from a circular path gradually into a converging path through the inlet 125 and into the active vertical conveying zone of the tube and spiral ramp all as described hereinabove.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A vertical mass flow conveyor for elevating bulk material comprising a vertically arranged tube having an inlet at the lower portion of the tube and an outlet at the upper portion of the tube, means for resiliently supporting the tube, means forming a spiral ramp within the tube, said ramp extending radially only a portion of the radius of the tube to leave a continuous cylindrical vertical open space extending from the inlet to the outlet of the tube, said spiral ramp having a surface exposed to said vertical open space, a hopper carried by the tube and receiving bulk material, means for guiding bulk material from the hopper through the tube inlet and into the vertical open space and against the exposed surface of the ramp at the lower portion of the tube, and means for transmitting a helical reciprocating movement to said tube and to said ramp for mass flow conveying the bulk material in columnar form up the inside of the tube through the open vertical space to said outlet for discharge.

2. A vertical conveyor as claimed in claim 1 wherein said spiral ramp has a radially directed outer surface in operative association with the inner surface of the tube.

3. A vertical conveyor as claimed in claim 1 wherein said spiral ramp is circular in cross-section.

4. A vertical conveyor as claimed in claim 3 wherein said ramp has a diameter in the range of 5% to 75% of the inside radius of the tube.

5. A vertical conveyor as claimed in claim 2 wherein said tube and said hopper are affixed to a base and wherein said guiding means comprises a cone-shaped member and means for affixing the cone-shaped member to the base concentrically inside the bottom of the tube for initially changing the direction of incoming bulk material at the tube inlet upward on the inside of the tube.

6. A vertical conveyor as claimed in claim 1 wherein said means for guiding said material into the tube is at least one vane having one end in the hopper and having the other end pointing into the tube.

7. A vertical conveyor as claimed in claim 6 wherein said means for guiding said material comprises two vanes circumferentially spaced from each other about the tube.

8. A vertical conveyor as claimed in claim 7 wherein the vanes are curved in shape with the concave side facing into the oncoming path of the bulk material.

9. A vertical conveyor as claimed in claim 1 wherein a second tube is centrally located inside said first named tube in spaced relationship to said first named tube, and wherein said ramp has an inner surface in operative association with the outer surface of said second tube.

10. A vertical conveyor as claimed in claim 9 wherein a second spiral shaped ramp is positioned in said first named tube in operative association with said first named tube, and wherein said second spiral shaped ramp is radially spaced from said fist named spiral shaped ramp, said spaced ramps combined with said means for transmitting helical reciprocating movement for conveying bulk material vertically in said first named tube.

11. A vertical conveyor as claimed in claim 2 wherein said spiral ramp is comprised of a relatively thin flat ribbon material formed in the spiral shape and presenting a flat vertically facing working surface for contacting said bulk material.

12. A vertical conveyor as claimed in claim 11 wherein said spiral ramp has one radially directed edge in operative association with the inner surface of said tube.

13. A vertical conveyor for elevating bulk material comprising a vertically arranged tube having an inlet at the lower portion of the tube and an outlet at the upper portion of the tube, means for resiliently supporting the tube, means forming a spiral ramp within the tube, said spiral ramp having a outer surface in operative association with the inner surface of the tube, said ramp extending radially inward from the tube only a portion of the radius of the tube to leave the center section of the tube free thereof and forming a continuous cylindrical vertical open space, said outer ramp surface being exposed to the vertical space, a hopper carried by the tube for feeding material to the lower portion of the tube, means for guiding material from the hopper through the tube inlet, into the vertical open space, and against the exposed surface of the ramp, and means for transmitting a helical reciprocating movement to said tube for mass flow conveying the bulk material in columnar form up the inside of the tube through the open vertical space to said outlet for discharge.

14. A vertical conveyor as claimed in claim 13 wherein said spiral ramp is circular in cross-section.

15. A vertical conveyor as claimed in claim 13 wherein said means for guiding said material into the tube is at least one curve-shaped vane having one end in the hopper and having the other end in the tube and wherein the curve-shaped vane has a concave side facing into the oncoming path of the bulk material.

16. A vertical conveyor as claimed in claim 15 wherein said means for guiding said material comprises two curve-shaped vanes circumferentially spaced from each other about the tube.

17. A vertical conveyor for mass flow of bulk material comprising a vertically arranged tube, means resiliently supporting the tube for limited helical movement, means forming a spiral ramp within the tube, said ramp having an outer surface in contact with and supported by the inner surface of the tube, said ramp extending radially inward from the inner surface of the tube only a portion of the distance to the center of the tube to leave the center section of the tube free thereof and forming a continuous cylindrical vertical open space, said ramp having an outer surface exposed to the vertical open space, trough means at the lower end of the tube, means for guiding bulk material from the trough into the vertical open space and against the exposed outer surface of the spiral ramp, and means for transmitting a helical reciprocating movement to said tube for conveying bulk material in columnar form from the trough means to an outlet at the upper portion of the tube through the open vertical space.

18. A vertical conveyor as claimed in claim 6 wherein said guiding means includes means for adjusting the orientation of the one vane relative to the tube to thereby control vertical rate of flow of the bulk material.

19. A vertical mass flow conveyor for elevating bulk material, said vertical mass flow conveyor comprising a vertically arranged tube having an inlet and an outlet above the inlet, there being a continuous cylindrical vertical open space between the tube inlet and tube outlet, means for continuously feeding bulk material into the tube inlet, and vibratory means for continuously conveying incoming bulk material at the tube inlet vertically through said open tube space in columnar form and toward the outlet.

20. The vertical mass flow conveyor according to claim 19 wherein said conveying means includes a spiral ramp radially adjacent said vertical open space and having a surface exposed to the vertical open space and said feeding means comprising means to continuously feed bulk material into the tube inlet and vertical open space and against the spiral ramp surface.

21. A vertical conveyor as claimed in 20 wherein said vibratory means includes means for transmitting a helical reciprocating movement to said tube and spiral ramp.

22. A vertical conveyor as claimed in claim 21 wherein the vertical space is located centrally of the tube, and said vibratory means includes means adjacent the tube inlet for directing bulk material radially outwardly from a central axis of the tube.

23. A vertical conveyor as claimed in claim 22 wherein said directing means comprises a cone-shaped member and means mounting the cone-shaped member in inverted, fixed relationship to the tube.

24. A vertical conveyor as claimed in claim 22 wherein said means for continuously feeding bulk material comprises a hopper, means fixedly mounting the tube to the hopper, a vane with spaced ends and means mounting the vane to the tube so that one vane end is in the hopper and the other vane end points into the tube inlet.

25. A vertical conveyor as claimed in claim 24 wherein said vane has a concave surface for directing bulk materials into the tube inlet.

26. A vertical conveyor as claimed in claim 24 wherein said mounting means comprises means for pivotally mounting the vane for movement relative to the tube about a vertical axis.

* * * * *